(12) United States Patent
Gallardo et al.

(10) Patent No.: US 8,738,573 B2
(45) Date of Patent: May 27, 2014

(54) OPTIMISTIC VERSIONING CONCURRENCY SCHEME FOR DATABASE STREAMS

(75) Inventors: John Edward Gallardo, Woodinville, WA (US); Tudor M Trufinescu, Redmond, WA (US); Yunxin Wu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 12/126,415

(22) Filed: May 23, 2008

(65) Prior Publication Data

US 2009/0292717 A1  Nov. 26, 2009

(51) Int. Cl.
*G06F 7/00* (2006.01)
*G06F 17/00* (2006.01)
*G06F 17/30* (2006.01)

(52) U.S. Cl.
USPC .......................... 707/638; 707/695; 707/806

(58) Field of Classification Search
None
See application file for complete search history.

(56) References Cited

U.S. PATENT DOCUMENTS

| | | | |
|---|---|---|---|
| 5,280,612 A | | 1/1994 | Lorie et al. |
| 5,287,496 A | | 2/1994 | Chen et al. |
| 5,410,697 A | | 4/1995 | Baird et al. |
| 5,490,270 A | | 2/1996 | Devarakonda et al. |
| 5,870,758 A | | 2/1999 | Bamford et al. |
| 5,974,427 A | * | 10/1999 | Reiter ................................. 1/1 |
| 7,243,088 B2 | | 7/2007 | Verma et al. |
| 7,379,954 B2 | * | 5/2008 | Shoens ............................... 1/1 |
| 7,730,032 B2 | * | 6/2010 | Idicula et al. ................. 707/638 |
| 2004/0199734 A1 | * | 10/2004 | Rajamani et al. ............. 711/163 |
| 2005/0022051 A1 | * | 1/2005 | Zane et al. ......................... 714/6 |
| 2005/0039049 A1 | | 2/2005 | Chang et al. |
| 2005/0289189 A1 | | 12/2005 | Nettleton et al. |
| 2006/0069885 A1 | * | 3/2006 | Matsui et al. ................. 711/154 |
| 2006/0161606 A1 | | 7/2006 | Biswal et al. |
| 2007/0198659 A1 | * | 8/2007 | Lam ............................... 709/219 |
| 2008/0077629 A1 | * | 3/2008 | Lorenz et al. ................. 707/203 |

OTHER PUBLICATIONS

Wu, et al., "Dynamic Finite Versioning: An Effective Versioning Approach to Concurrent Transaction and Query Processing", In Proceedings of International Conference Data Engineering, 1993, pp. 10.

"Google Data APIs Protocol Reference", retrieved at <<http://code.google.com/apis/gdata/reference.html>>, 2008, Google, pp. 21.

Merchant, et al., "Performance Analysis of Dynamic Finite Versioning Schemes: Storage Cost vs. Obsolescence", IEEE Transactions on Knowledge and Data Engineering, Vol. 8, No. 6, Dec. 1996, IEEE pp. 985-1001.

Silberschatz, "A Multi-Version Concurrency Scheme With No Rollbacks", Proceedings of the first ACM SIGACT-SIGOPS symposium on Principles of distributed computing, 1982, ACM, pp. 216-223.

* cited by examiner

*Primary Examiner* — Mohammad S. Rostami
*Assistant Examiner* — Berhanu Mitiku
(74) *Attorney, Agent, or Firm* — Nicholas Chen; Kate Drakos; Micky Minhas

(57) ABSTRACT

Aspects of the subject matter described herein relate to versioning for databases. In aspects, two or more users may share the same version of data, such as a report, in a database. One of the users may seek to update the data. In response to a request from the user, a new version of the data is created. For data that is not updated via the request, the new version shares data with the previous version, thus saving space. For data this is updated, new segments within the database are created to store the updated data. Each user is allowed to access the data without blocking other users accessing the data.

17 Claims, 6 Drawing Sheets

OPTIMISTIC VERSIONING CONCURRENCY SCHEME FOR DATABASE STREAMS

BACKGROUND

In a database, several users may seek to access a report. After a report has been generated and accessed by a user, it may be stored for use by subsequent users. This is sometimes done by storing the report in a column of a single row of a table.

In the process of accessing a report, a user may desire to modify the report. To modify the report, a row that includes the report may be locked. When this occurs, other processes that seek to access the report may be blocked until the lock is released. When there are several users that seek to access the report, this may lead to significant wait times.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to versioning for databases. In aspects, two or more users may share the same version of data, such as a report, in a database. One of the users may seek to update the data. In response to a request from the user, a new version of the data is created. For data that is not updated via the request, the new version shares data with the previous version, thus saving space. For data this is updated, new segments within the database are created to store the updated data. Each user is allowed to access the data without blocking other users accessing the data.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
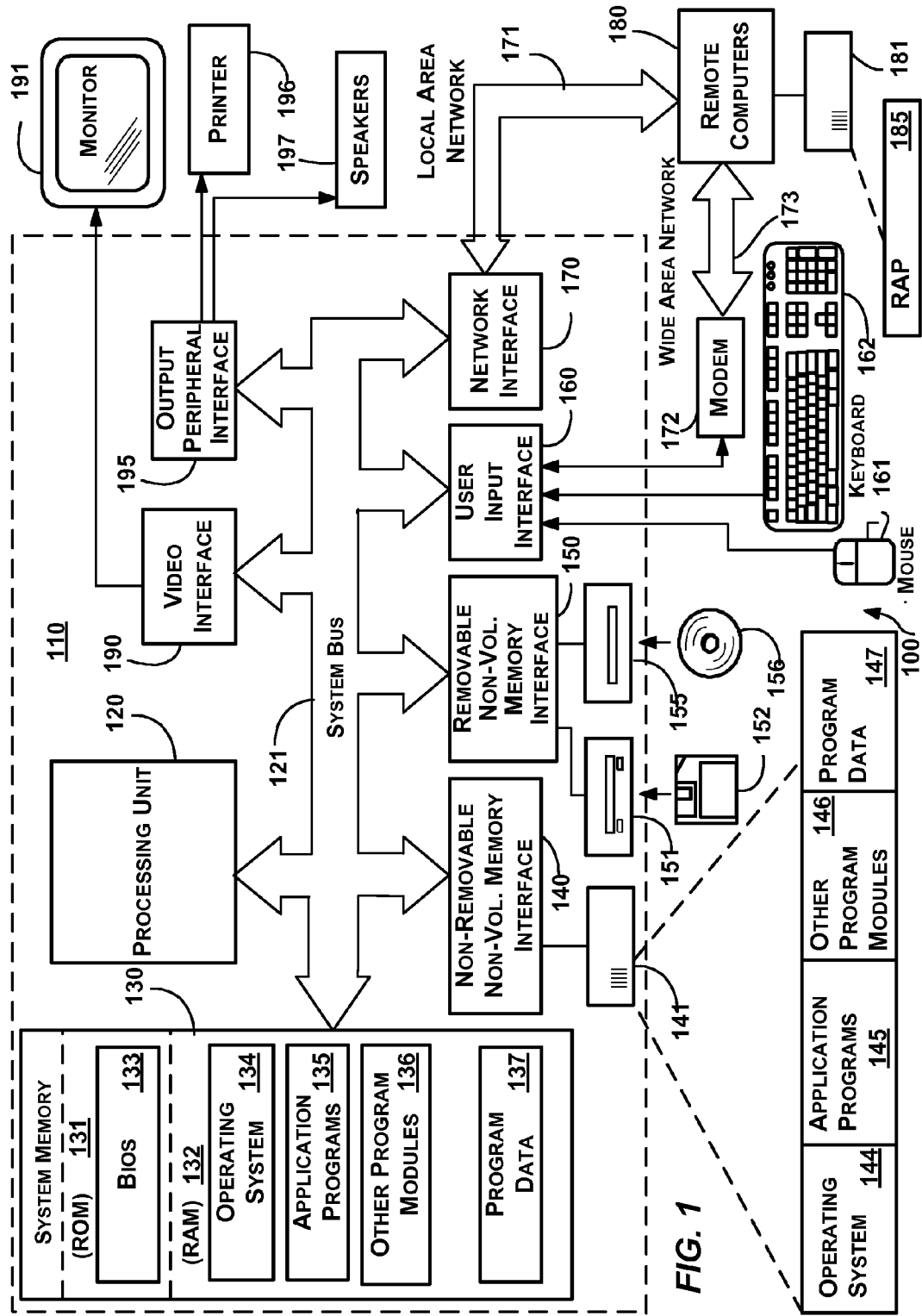
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Versioning for Database Streams

As mentioned previously, several users may concurrently seek to access a report from a database. Some of these users may want to read the report while others may seek to update the report with additional information. If the report is stored in a single row of a database, updates to the report may block others users from accessing the report until the updates complete. Although the term "report" is sometimes used herein, aspects of the subject matter may also be applied to other data that is stored in a database.

Figure 2:
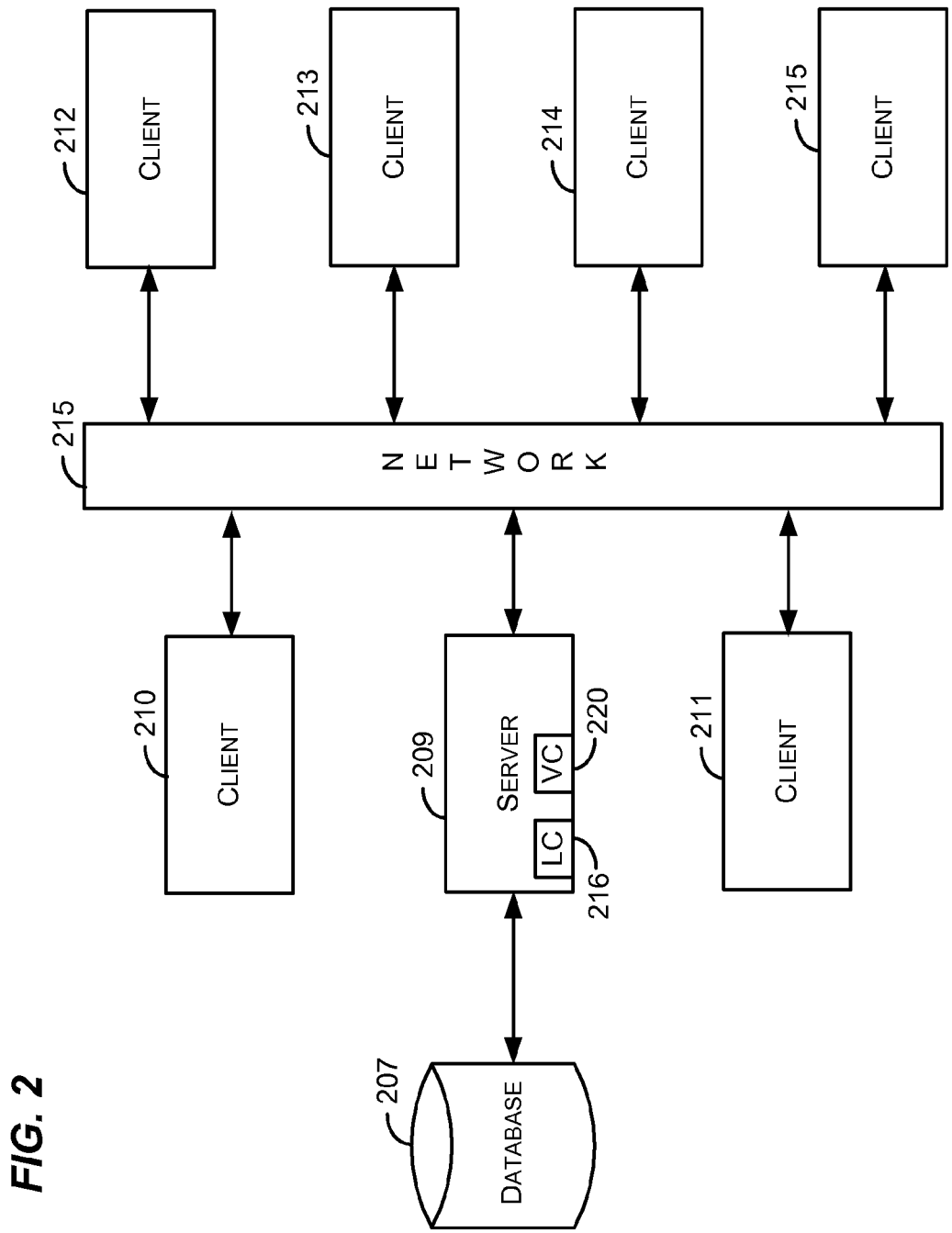
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include a database 207, a server 209, and clients 210-215 and may include other entities (not shown). The various entities may be located relatively close to each other or may be distributed across the world. The various entities may communicate with each other via various networks including intra- and inter-office networks and the network 215.

The database 207 comprises a repository that is capable of storing data in a structured format. The term data is to be read broadly to include anything that may be stored on a computer storage medium. Some examples of data include information, program code, program state, program data, other data, and the like.

Data stored in the database 207 may be organized in tables, records, objects, other data structures, and the like. The data may be stored in HTML files, XML files, spreadsheets, flat files, document files, and other files. The database 207 may be classified based on a model used to structure the data. For example, the database 207 may comprise a relational database, object-oriented database, hierarchical database, network database, other type of database, some combination or extension of the above, and the like.

The database 207 may be accessed via a database management system (DBMS). A DBMS may comprise one or more programs that control organization, storage, management, and retrieval of data in the database 207. A DBMS may receive requests to access data in the database and may perform the operations needed to provide this access. Access as used herein may include reading data, writing data, deleting data, updating data, a combination including one or more of the above, and the like.

The database 207 may be stored on a data store. A data store may comprise any storage media capable of storing data. For example, a data store may comprise a file system, volatile memory such as RAM, other storage media described in conjunction with FIG. 1, other storage, some combination of the above, and the like and may be distributed across multiple devices. The data store upon which the database 207 is stored may be external, internal, or include components that are both internal and external to the server 209. Similarly, the database 207 and/or DBMS may be hosted by or separate from the server 209.

The server 209 may be implemented on or as one or more computers (e.g., the computer 110 as described in conjunction with FIG. 1). The server 209 may comprise one or more processes that provide access to data in the database 207. In one embodiment, the server 209 may host a DBMS by which the clients 210-215 may create, request, receive, and update data stored on the database 207. In another embodiment, the server 209 may host a Web server that the clients 210-215 may use to access data on the database 207. In yet another embodiment, the server 209 may host another service by which the clients 210-215 may access data on the database 207.

Each of the clients 210-215 may be implemented on or as one or more computers (e.g., the computer 110 as described in conjunction with FIG. 1). A client may comprise one or more processes that request access, either directly or indirectly, to data on the database 207. For example, a client may comprise a Web browser that accesses data from the database via a Web server that executes on the server 209. As another example, a client may comprise an application that stores data to and retrieves data from the database 207 via a DBMS that executes on the server 209.

The server 209 may host a local client 216. A local client may comprise one or more local processes that requests access to data on the database 207. Local, in this sense, refers to a process that executes on the same machine as the machine upon which the server 209 is implemented.

Although the terms "client" and "server" are used, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At various times, a client and server may both be peers, servers, or clients.

The server 209 may include a versioning component 220. Briefly, the versioning component 220 allows each client requesting data from the database 207 to see a "frozen in time" version of the requested data. After a client has requested data from the database 207, other updates from other clients do not affect the version that the client has requested. If the client updates data in its version, the client sees its own updates, but these updates do not affect other clients that are currently accessing the database 207. A client that requests a write lock of data does not block another client that also requests a write lock of the data.

Figure 3:
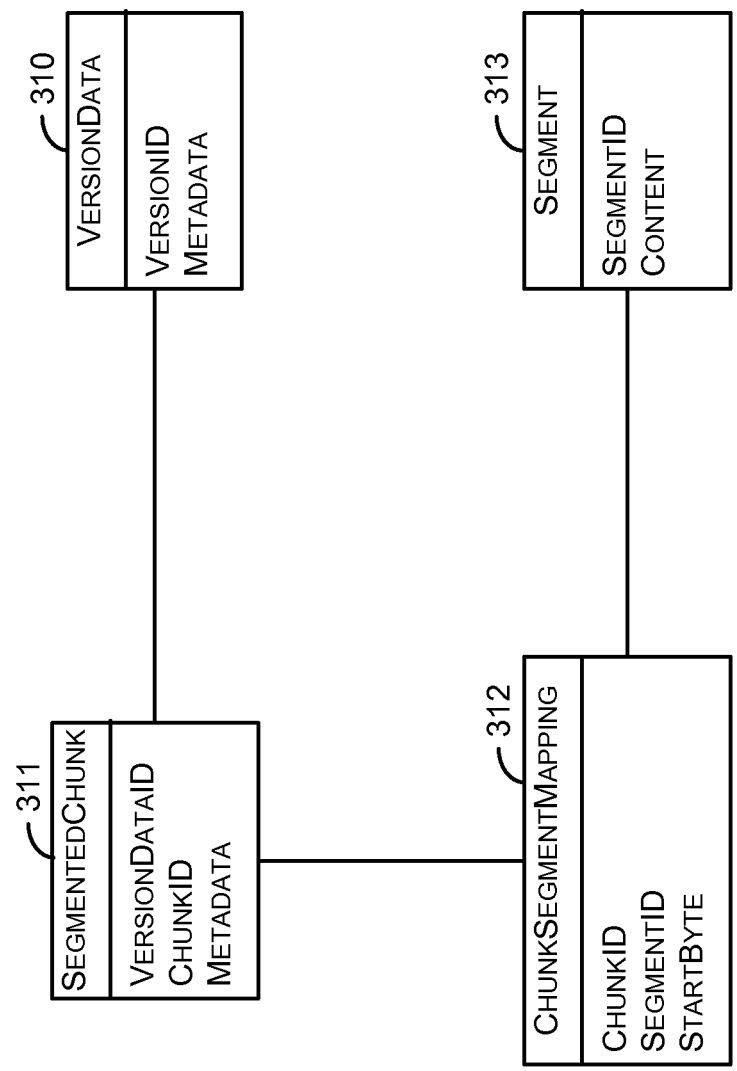
FIG. 3 is a block diagram that generally represents a schema that may be used in accordance with aspects of the subject matter described herein.

To create a version of a report, a database schema such as that shown in FIG. 3 may be employed. FIG. 3 is a block diagram that generally represents a schema that may be used in accordance with aspects of the subject matter described herein. The schema 305 includes a VersionData entity type 310, a SegmentedChunk entity type 311, a ChunkSegmentMapping entity type 312, and a Segment entity type 313. In one embodiment, entities of these entity types may be embodied in tables in a database.

A chunk may be defined as a sequence of bytes from a database. A chunk may be identified by a chunk identifier. A version may be defined as a collection of one or more chunks. A segment may be defined as a portion of a chunk.

A version may be associated with one or more chunks via a SegmentedChunk entity. A SegmentedChunk entity includes a version identifier (e.g., VersionID) and a chunk ID (e.g., ChunkID) and may also include metadata. The version identifier of a SegmentedChunk entity associates a chunk with a particular version (e.g., the version having a version identifier equal to the version identifier in the SegmentedChunk).

A ChunkSegmentMapping entity associates a chunk with a segment of the chunk. A complete chunk can be reconstructed using multiple ChunkSegmentMapping entities and their associated segments. The StartByte field of a ChunkSegmentMapping entity may be used to order the segments of a chunk.

A Segment entity includes data of a segment having a particular SegmentID that is included in the Segment entity.

When a first user requests access to a report, the user is bound to a version of the report. The version the user is bound to may be the most recent version, the last written to version, the most complete version, a version specified by the user, some other version, or the like. If another user requests access to the report, the other user may also be bound to the same version of the report. If one of the users attempts to perform an update of the report, a new version is created, and the user attempting to perform the update is bound to the new version.

Below are some exemplary tables that may be used to maintain versions as multiple users access a report. These exemplary tables are used in an example to describe how these tables may be updated as users access data in the report. It is to be understood that these tables and sequence of events are exemplary only. Based on the teachings herein, those skilled in the art will recognize how to apply the principles contained herein to other scenarios.

First, assume that no users are currently accessing a report. When a user first creates a report, this may involve a lot of calculations and manipulation of data to create the report. The results of the report may be stored in multiple segments associated with one or more chunks. These chunks may be associated with a version. For example, the report may be associated with a version having a version identifier of S1 as indicated in the tables below:

| SegmentedChunk Table | | |
|---|---|---|
| VersionID | ChunkID | Metadata |
| S1 | C1 | ~ |

| ChunkSegmentMapping Table | | |
|---|---|---|
| ChunkID | SegmentID | StartByte |
| C1 | Seg1 | 0 |
| C1 | Seg2 | 32000 |

| Segment Table | |
|---|---|
| SegmentID | Content |
| Seg1 | Data1 |
| Seg2 | Data2 |

As illustrated, the Segment table includes two segments. Each segment includes data (e.g., Data1 or Data2) associated with a portion of the report. The ChunkSegmentMapping table indicates that the chunk having the ID of C1 maps to the two segments included in the Segment table. The SegmentedChunk table indicates that the version having the ID of S1 is associated with the chunk having the ID of C1. The "~" indicates metadata that is associated with a chunk/version mapping.

When a second process requests access to the report, the second process is provided access to the version S1. As soon as either process requests to update the report, a new version is created and tables are updated as described in more detail below.

Some terms that may be useful in describing this process are as follows:

1. A shallow version copy is created by duplicating the VersionData row for a given version with a new VersionID value. In order to bind the existing chunks for that version to the new copy, the corresponding rows in SegmentedChunk are also copied with the updated VersionID value.

2. A shallow chunk copy is created by duplicating a source chunk row in the SegmentedChunk table with a new target ChunkId. Additional ChunkSegmentMapping rows are inserting binding each segment of the source chunk to the new target chunk. At this point, the source and target chunks are an identical copy and share the rows in the Segment table which are the bulk of the needed storage space for the chunk.

3. A deep segment copy is created by copying a single row in the Segment table and changing the SegmentID. By updating the SegmentID in the ChunkSegmentMapping table, this allows two chunks that were previously sharing a single segment to receive their own copy of the segment.

As long as processes accessing a report do not update the report, they can share the same physical data (e.g., data in the Segment table). When a process updates the report, the following occurs:

1. If the update is the first write to the version for a user's session, then a Shallow Version Copy occurs and the user's session is now bound to (e.g., associated with) the new copy of the version.

2. If the update is the first write to a specific chunk within that version, then a Shallow Chunk Copy occurs for that chunk.

3. If the update is the first write to a specific segment of the chunk, then a Deep Segment Copy occurs for that segment.

In this manner, two users on independent requests are now able to share the same data and perform concurrent read/write operations on their independent copies of the data without observing locking side effects from each other.

For example, at a time that a first user requests access to a report, tables tracking versions of the report may include data such as:

| SegmentedChunk Table | | |
|---|---|---|
| VersionID | ChunkID | Metadata |
| S1 | C1 | ~ |

| ChunkSegmentMapping Table | | |
|---|---|---|
| ChunkID | SegmentID | StartByte |
| C1 | Seg1 | 0 |
| C1 | Seg2 | 32000 |

| Segment Table | |
|---|---|
| SegmentID | Content |
| Seg1 | 0x00AA |
| Seg2 | 0x00BB |

When a second user requests access to the report, the second user may be bound to the version S1. After a user updates the report (e.g., changes the Data in Seg2), the tables may look like:

| SegmentedChunk Table | | |
|---|---|---|
| VersionID | ChunkID | Metadata |
| S1 | C1 | ~ |
| S2 | C2 | ~ |

| ChunkSegmentMapping Table | | |
|---|---|---|
| ChunkID | SegmentID | StartByte |
| C1 | Seg1 | 0 |
| C1 | Seg2 | 32000 |
| C2 | Seg1 | 0 |
| C2 | Seg3 | 32000 |

Segment Table

| SegmentID | Content |
|---|---|
| Seg1 | 0x00AA |
| Seg2 | 0x00BB |
| Seg3 | 0x00BC |

In updating the tables, a shallow version copy, shallow chunk copy, and deep segment copy have been performed. The user bound to the version S1 has one version of the data while the user bound to the version S2 has another version of the data. The new data is added in segment Seg3 while the original data of segment Seg2 is unchanged. The two users continue to share data in segments that have not been changed (e.g., Seg1).

If data is added or inserted into a report without changing existing segments, new segments may be added to the Segment table while the two users continue to share the segments that have not been changed. If segments are changed while data is added or inserted into a report, a deep segment copy may be created for each segment that is changed.

In one embodiment, the later created version may not be eligible for use by other users until the request has completed and all transactions associated with the version complete (e.g., commit or rollback). Along these lines, updates performed on a version may be used to create or determine a new master (i.e., base) version to use for subsequent users that seek to obtain the report. In one embodiment, when two or more users concurrently have versions derived from a master version, the version of the user that first completes modifications may be used as the master version for subsequent users. In other embodiments, another mechanism (e.g., most extensive updates, the first version, a selected version, the version with the last update, and the like) for updating the master version may be used.

Segments may be compressed to save space, for example. Even though the compressed segments may have different lengths, this does not pose a problem for the Segment Table, provided the content column is sufficiently sized.

Although the environment described above includes a server, a database, and six clients, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 4:
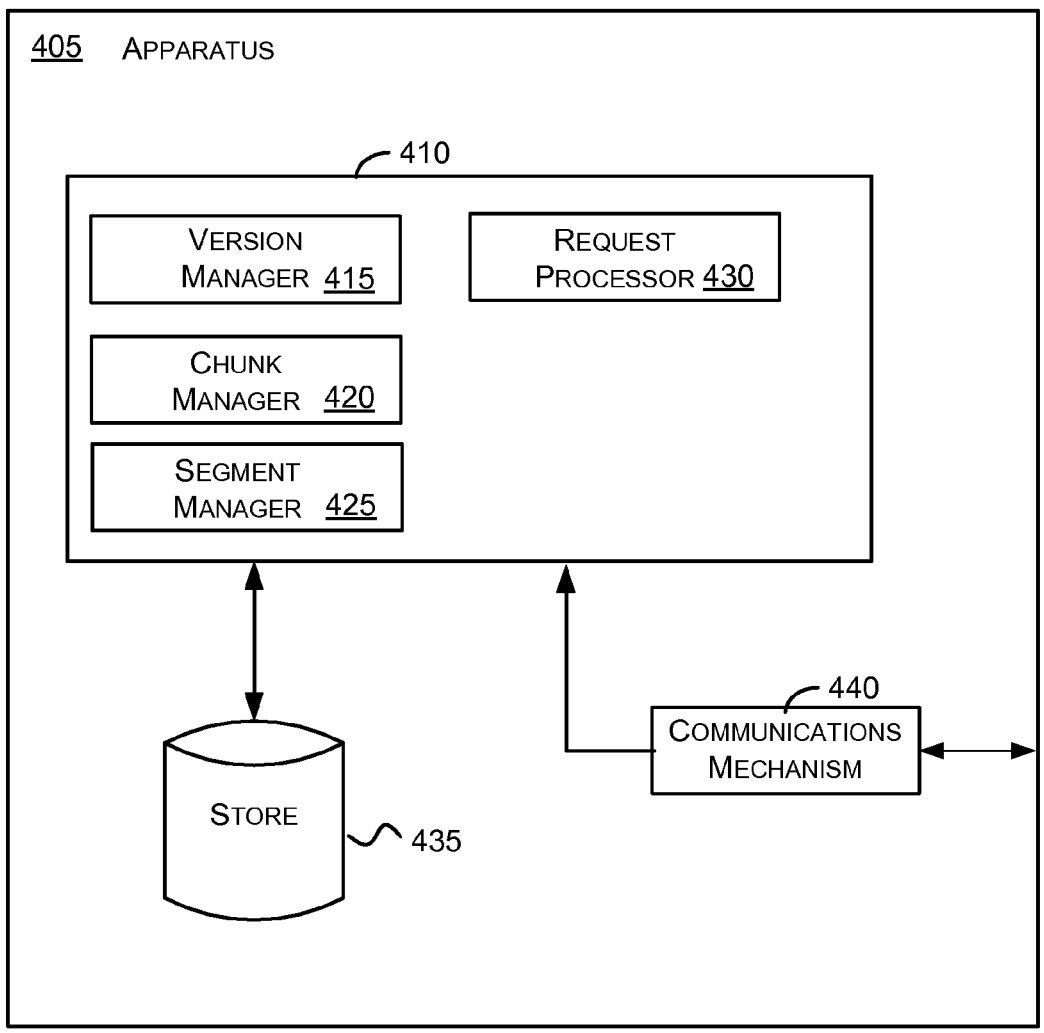
FIG. 4 is a block diagram that represents an exemplary apparatus configured with versioning components in accordance with aspects of the subject matter described herein.

FIG. 4 is a block diagram that represents an exemplary apparatus configured with versioning components in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices that are accessible to the apparatus 405.

Turning to FIG. 4, the apparatus may include versioning components 410, a store 435, and a communications mechanism 440. The versioning components 410 may include a version manager 415, a chunk manager 420, a segment manager 425, and a request processor 430. The versioning components 410 correspond to the versioning components 220 of the server 209 of FIG. 2.

The communications mechanism 440 allows the apparatus 405 to communicate with other entities as shown in FIG. 2. The communications mechanism 440 may be a network interface or adapter 170, modem 172, or any other mechanism for establishing communications as described in conjunction with FIG. 1.

The store 435 is any storage media capable of storing data and may include data stored in a database. The store 435 may comprise a file system, database, volatile memory such as RAM, other storage, some combination of the above, and the like and may be distributed across multiple devices. The store 435 may be external, internal, or include components that are both internal and external to the apparatus 405.

The version manager 415 may be operable to create, delete, and update versions as instructed by the request processor 430. In managing a version, the version manager 415 may associate a version with one or more chunks.

The chunk manager 420 may be operable to create, delete, and update chunks as instructed by the request processor 430. The chunk manager 420 may be further operable to associate a chunk with one or more segments.

The segment manager 425 may be operable to store data into and provide data from segments and may also be used to create and delete segments.

The request processor 430 may be operable to receive a request and to determine whether a new version, one or more chunks, and/or one or more segments are to be created, updated, or deleted, in response to the request. The request manager may follow the rules for creating copies of version data as described previously.

Each of the versioning components 410 may comprise a portion of a process and/or thread, a complete process, a set of processes, or the like. The code embodying the versioning components 410 may be found in a single module or many modules without departing from the spirit or scope of aspects of the subject mater described herein.

Figure 5:
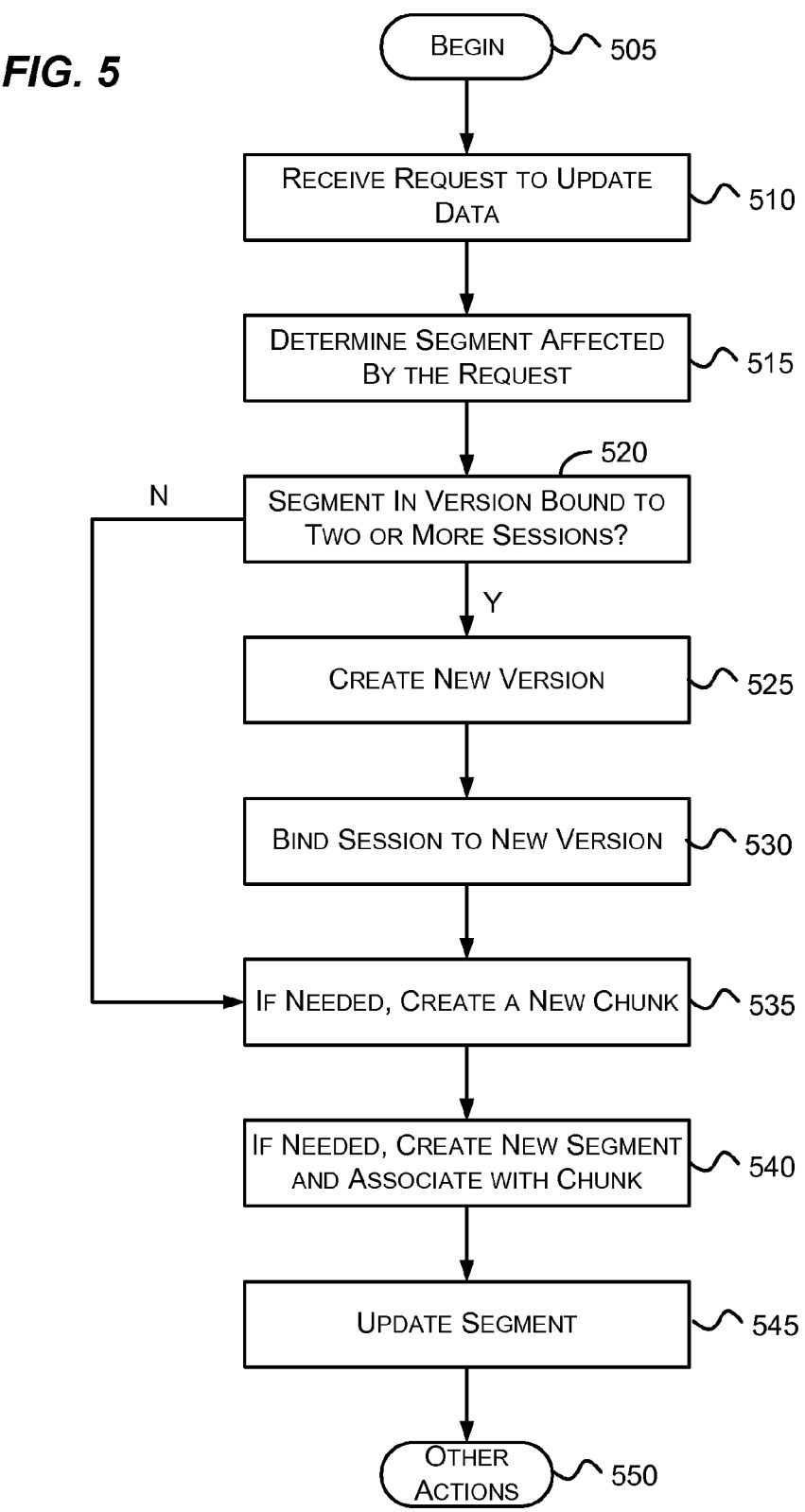
FIGS. 5-6 are flow diagrams that generally represent actions that may occur in conjunction with versioning in accordance with aspects of the subject matter described herein.
Figure 6:
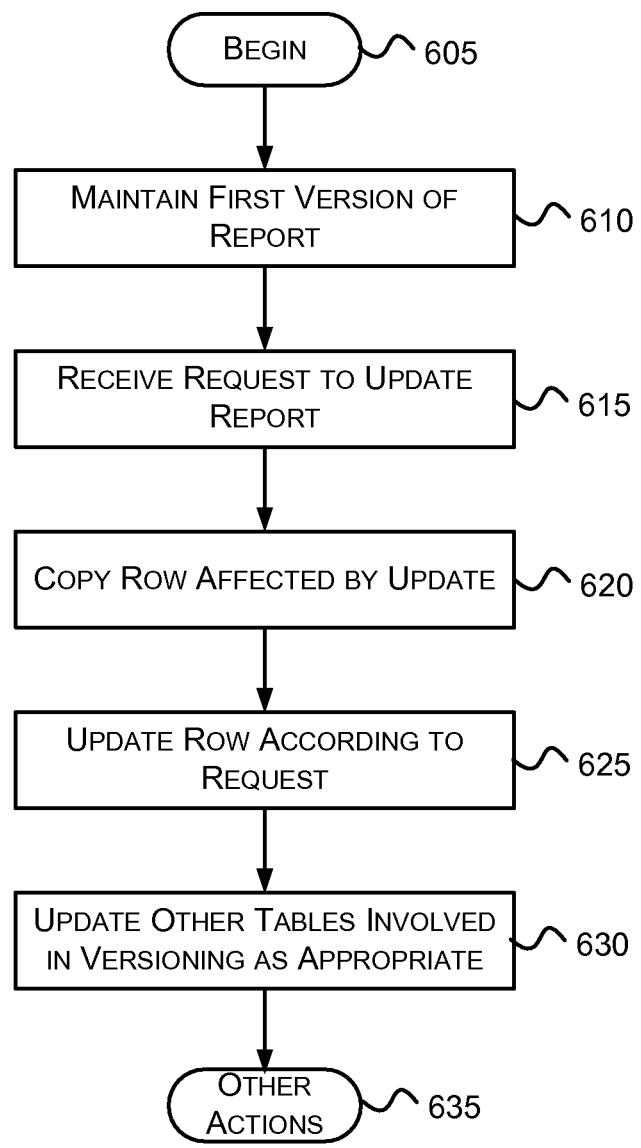

FIGS. 5-6 are flow diagrams that generally represent actions that may occur in conjunction with versioning in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 5, at block 505, the actions begin. At block 510, a request to update data is received. For example, referring to FIG. 4, the request processor 430 receives a request to update data in the store 435.

At block 515, a determination is made as to a segment that is affected by the request. For example, referring to FIG. 4, the segment manager 425 determines a segment that is affected by the request. In this context, "affect" means that data within the segment would need to be modified to fulfill to the request.

At block 520, a determination is made as to whether the affected segment is bound to two or more sessions. If so, the actions continue at block 530; otherwise, the actions continue at block 525. For example, if two or more sessions are bound to a single version and one of the sessions requests to update data within the version, a new version needs to be created so that the requesting session's updates do not affect the current version.

In another embodiment, the actions associated with blocks 515 and 520 may be replaced by keeping track of how many sessions are bound to a version and if an update request is received that affects data in the version, continuing at block 525; otherwise, continuing at block 535.

At block 525, a new version is created. For example, referring to FIG. 4, the request processor 430 instructs the version manager 415 to create a new version.

At block 530, the requestor's session is bound to the new version. For example, referring to FIG. 4, the request processor 430 may bind the requestor's session to the new version.

At block 535, if needed, a new chunk is created. For example, referring to FIG. 4, if the request processor 430 determines that in fulfilling the request that it would be the first time that a segment of a chunk is written to, the request processor 430 instructs the chunk manager 420 to perform a shallow chunk copy.

At block 540, if needed, a new segment is created and associated with a chunk. For example, referring to FIG. 4, if the request processor 430 determines that in fulfilling the request that it would be the first time that a segment of a chunk is written to, the request processor 430 instructs the segment manager 420 to perform a deep segment copy. In conjunction with performing a deep segment copy, the request processor may instruct the chunk manager 420 to cause the new segment to be associated with a chunk.

At block 545, the segment is updated. For example, referring to FIG. 4, the request processor 430 may utilize the segment manager 425 to update the new segment in accordance with the request.

At block 545, other actions may occur.

Turning to FIG. 6, at block 605, the actions begin. At block 610, a first version of a report is maintained via a plurality of rows in a table of a database. For example, the report may be maintained in multiple segments in a Segment tables as previously discussed.

At block 615, a request to update the report is received. For example, when two or more sessions reference the same version of a report and a request to update the report is received via one of the sessions, this signals that a new version of the report is needed.

At blocks 620-630, while maintaining the first version of the report, a second version is created. At block 620, a row affected by the update may be copied. For example, referring to FIG. 4, the request processor 430 may instruct the segment manager 425 to perform a deep segment copy.

At block 625, the first or the second row is updated to include data corresponding to the update. For example, referring to FIG. 4, the request processor 430 may instruct the segment manager 425 to update the copied row to include data corresponding to the update.

At block 630, other tables involved in the versioning are updated as appropriate. For example, if the update is a first write to a particular version, a shallow version copy may be performed. As another example, if the update is a first write to a particular chunk, a shallow chunk copy may be performed. During updating these other tables, rows may be updated to reference rows in the first version of the report that are also included in the second version of the report. For example chunks in a ChunkSegmentMapping table may be added during a shallow version copy to reference segments in the Segment table as described previously.

At block 635, other actions, if any, may occur.

Aspects of the subject matter described herein may also be applied to address the "lost update" problem with respect to reports. In the "lost update" problem, data is unintentionally overwritten due to concurrent updates by two or more users. In an example of the "lost update" problem, the following events may occur:

1. A current value of a data value may be 2.
2. One user may increase the data value by 2.
3. Concurrently, another user may increase the data value by 1.

Depending on which update occurs first, the resulting value of the data value may either be 4 (2+2) or 3 (2+1) while the correct value may be 5 (2+2+1).

In creating a report, an "update" to the report may simply fill in portions of a given report that have not already been filled in. The report, however, is calculated based on a report definition and data input, both of which do not change during the life time of the "report" instance. Even if a concurrent update overwrites another update, the two updates are guaranteed to be identical because they are based on the same underlying data. Thus, aspects of the subject matter described herein may be used to allow concurrent updates without affecting the end result of the updates As can be seen from the foregoing detailed description, aspects have been described related to versioning within a database. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-executable storage device having computer-executable instructions, which when executed perform actions, comprising:

maintaining a first version of a report via a plurality of rows of a first table of a database, the rows including data associated with the report;

allowing a first user and a second user to concurrently access the first version of the report, wherein the first user and the second user share the report via a same physical data;

receiving a request from the second user to update the report; while maintaining the first version of the report, creating a second version of the report by, in part, actions comprising:

copying at least a portion of a first row of the first table that is affected by the update to create a second row in the first table;

changing data of the first or second rows to include data corresponding to the update;

in response to changing data of one of the first or second row, the first row and the second row having different versions of data; and updating one or more other tables to reference rows in the first version of the report that are also included in the second version of the report, wherein the first user accesses the first version of the report, and the second user maintains accesses the second version of the report, the first version not affected by the update to the report, wherein the first user and the second user continue to share access to a same physical data of at least one unmodified segment and wherein updating one or more other tables to reference rows in the first version of the report that are also included in the second version of the report comprises updating a mapping table that maps chunks to rows of the table, the first version of the report being associated with one or more chunks, wherein updating a mapping table that maps chunks to rows of the table comprises creating a new row in the mapping table for each chunk associated with the first version of the report and associating each chunk so created with the second version of the report.

2. The computer-executable storage device of claim 1, wherein updating a mapping table that maps chunks to rows of the table comprises creating a new row in the mapping table for each chunk associated with the first version of the report and associating each chunk so created with the second version of the report.

3. The computer-executable storage device of claim 1, wherein the one or more other tables indicate an order in which the data included in the rows is to be assembled to create the report.

4. The computer-executable storage device claim 1, further comprising updating the first version of the report with data included in the second version of the report, the first version as updated being used as a base version when creating a third version of the report.

5. The computer-executable storage device of claim 1, further comprising providing concurrent access to the two versions of the report.

6. The computer-executable storage device of claim 1, further comprising receiving a request to update shared data that is shared between the first and second versions of the report and in response thereto, copying at least a portion.

7. A method implemented at least in part by a computer, the method comprising:
  maintaining a first version of a report via a plurality of rows of a first table of a database, the rows including data associated with the report;
    allowing a first user and a second user to concurrently access the first version of the report, wherein the first user and the second user share the report via a same physical data;
  receiving a request from the second user to update the report;
  while maintaining the first version of the report, creating a second version of the report by, in part, actions comprising:
  copying at least a portion of a first row of the first table that is affected by the update to create a second row in the first table;
  changing data of the first or second rows to include data corresponding to the update;
  in response to changing data of one of the first or second row, the first row and the second row having different versions of data;
  updating one or more other tables to reference rows in the first version of the report that are also included in the second version of the report;
  receiving a request to update shared data that is shared between the first and second versions of the report and in response thereto, copying at least a portion of the shared data into one or more new rows of the first table and updating the one or more other tables to include information that indicates that the shared data is no longer shared between the first and second versions,
  wherein the first user accesses the first version of the report, and the second user maintains accesses the second version of the report, the first version not affected by the update to the report, wherein the first user and the second user continue to share access to a same physical data of at least one unmodified segment, wherein updating one or more other tables to reference rows in the first version of the report that are also included in the second version of the report comprises updating a mapping table that maps chunks to rows of the table, the first version of the report being associated with one or more chunks, wherein updating a mapping table that maps chunks to rows of the table comprises creating a new row in the mapping table for each chunk associated with the first version of the report and associating each chunk so created with the second version of the report.

8. The method of claim 7, wherein updating a mapping table that maps chunks to rows of the table comprises creating a new row in the mapping table for each chunk associated with the first version of the report and associating each chunk so created with the second version of the report.

9. The method of claim 7, wherein the one or more other tables indicate an order in which the data included in the rows is to be assembled to create the report.

10. The method of claim 7, further comprising updating the first version of the report with data included in the second version of the report, the first version as updated being used as a base version when creating a third version of the report.

11. The method of claim 7, further comprising providing concurrent access to the two versions of the report.

12. In a computing environment, an apparatus comprising:
  a computer coupled to memory, the memory storing a programmable module that:
  maintains a first version of a report via a plurality of rows of a first table of a database, the rows including data associated with the report;
  allows a first user and a second user to concurrently access the first version of the report, wherein the first user and the second user share the report via a same physical data;
  receives a request from the second user to update the report; while maintaining the first version of the report, creates a second version of the report by, in part, actions comprising:
  copying at least a portion of a first row of the first table that is affected by the update to create a second row in the first table;
  changing data of the first or second rows to include data corresponding to the update;
  in response to changing data of one of the first or second row, the first row and the second row having different versions of data; and
  updating one or more other tables to reference rows in the first version of the report that are also included in the second version of the report,
  wherein the first user accesses the first version of the report, and the second user maintains accesses the second version of the report, the first version not affected by the update to the report, wherein the first user and the second user continue to share access to a same physical data of at least one unmodified segment and wherein updating one or more other tables to reference rows in the first version of the report that are also included in the second version of the report comprises updating a mapping table that maps chunks to rows of the table, the first version of the report being associated with one or more chunks, wherein updating a mapping table that maps chunks to rows of the table comprises creating a new row in the mapping table for each chunk associated with the first version of the report and associating each chunk so created with the second version of the report.

13. The apparatus of claim 12, wherein updating a mapping table that maps chunks to rows of the table comprises creating a new row in the mapping table for each chunk associated with the first version of the report and associating each chunk so created with the second version of the report.

14. The apparatus of claim 12, wherein the one or more other tables indicate an order in which the data included in the rows is to be assembled to create the report.

15. The apparatus of claim 12, the program module further updating the first version of the report with data included in the second version of the report, the first version as updated being used as a base version when creating a third version of the report.

16. The apparatus of claim 12, the program module further providing concurrent access to the two versions of the report.

17. The apparatus of claim 12, the program module further receives a request to update shared data that is shared between the first and second versions of the report and in response thereto, copies at least a portion of the shared data into one or more new rows of the first table and updates the one or more other tables to include information that indicates that the shared data is no longer shared between the first and second versions.

\* \* \* \* \*